(12) United States Patent
Stenson et al.

(10) Patent No.: US 7,760,206 B2
(45) Date of Patent: *Jul. 20, 2010

(54) PROCESSOR TASK AND DATA MANAGEMENT

(75) Inventors: Richard B. Stenson, Foster City, CA (US); John P. Bates, Redwood City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/371,424

(22) Filed: Feb. 13, 2009

(65) Prior Publication Data

US 2009/0147013 A1 Jun. 11, 2009

Related U.S. Application Data

(63) Continuation of application No. 11/238,095, filed on Sep. 27, 2005, now Pat. No. 7,522,168.

(51) Int. Cl.
*G06T 15/00* (2006.01)

(52) U.S. Cl. .................. 345/505; 345/530; 709/231

(58) Field of Classification Search .................. 345/530, 345/505; 709/231
See application file for complete search history.

(56) References Cited

U.S. PATENT DOCUMENTS

| | | | |
|---|---|---|---|
| 3,496,551 A | 2/1970 | Driscoll et al. ........... 340/172.5 |
| 3,596,257 A | 7/1971 | Patel | |
| 5,047,923 A | 9/1991 | Elstner et al. | |
| 5,136,712 A | 8/1992 | Perazzoli et al. | |
| 5,185,694 A | 2/1993 | Edenfield et al. ............ 710/107 |
| 5,452,452 A | 9/1995 | Gaetner et al. .............. 395/650 |
| 5,504,901 A | 4/1996 | Peterson | |
| 5,528,513 A | 6/1996 | Vaitzblit et al. | |
| 5,592,671 A | 1/1997 | Hirayama ................... 385/674 |
| 5,745,778 A | 4/1998 | Alfieri ................... 395/800.01 |
| 5,794,017 A | 8/1998 | Evans et al. ................. 395/507 |
| 5,832,262 A | 11/1998 | Johnson et al. ............. 395/672 |
| 6,003,112 A | 12/1999 | Tetrick ........................ 711/100 |
| 6,144,986 A | 11/2000 | Silver .......................... 709/201 |

(Continued)

FOREIGN PATENT DOCUMENTS

EP 459931 12/1991

(Continued)

OTHER PUBLICATIONS

Sony Computer Entertainment Incorporated, "Cell Broadband Engine Architecture", Version 1.0, Aug. 8, 2005.

(Continued)

*Primary Examiner*—Phu Nguyen
(74) *Attorney, Agent, or Firm*—Joshua D. Isenberg; JDI Patent (57) ABSTRACT

Task and data management systems methods and apparatus are disclosed. A processor event that requires more memory space than is available in a local storage of a co-processor is divided into two or more segments. Each segment has a segment size that is less than or the same as an amount of memory space available in the local storage. The segments are processed with one or more co-processors to produce two or more corresponding outputs.

44 Claims, 9 Drawing Sheets

U.S. PATENT DOCUMENTS

| | | | |
|---|---|---|---|
| 6,279,040 B1 | 8/2001 | Ma et al. ................... 709/231 |
| 6,289,369 B1 | 9/2001 | Sundaresan ................ 709/103 |
| 6,295,598 B1 | 9/2001 | Bertoni et al. |
| 6,370,681 B1 | 4/2002 | Dellarocas et al. .......... 717/110 |
| 6,526,491 B2 | 2/2003 | Suzuoki et al. |
| 6,665,699 B1 | 12/2003 | Hunter et al. ............... 709/102 |
| 6,665,783 B2 | 12/2003 | Zahir ......................... 711/165 |
| 6,728,959 B1 | 4/2004 | Merkey ...................... 718/102 |
| 7,058,750 B1 | 6/2006 | Rankin et al. ............... 710/317 |
| 7,127,477 B2 | 10/2006 | Duncombe et al. .......... 707/203 |
| 7,236,738 B2 | 6/2007 | Settle ......................... 455/3.01 |
| 7,236,998 B2 | 6/2007 | Nutter et al. ................ 708/446 |
| 7,298,377 B2 | 11/2007 | Fossum et al. .............. 345/584 |
| 7,304,646 B2 | 12/2007 | Iwata ......................... 345/537 |
| 7,321,958 B2 | 1/2008 | Hofstee et al. .............. 711/153 |
| 7,478,390 B2 | 1/2009 | Brokenshire et al. |
| 7,516,456 B2 | 4/2009 | Aguilar et al. |
| 7,522,168 B2 * | 4/2009 | Stenson et al. .............. 345/505 |
| 7,565,651 B1 | 7/2009 | Carey |
| 2002/0138637 A1 | 9/2002 | Suzuoki et al. ............. 709/230 |
| 2003/0154284 A1 | 8/2003 | Bernardin et al. |
| 2003/0195920 A1 | 10/2003 | Brenner et al. |
| 2004/0054883 A1 | 3/2004 | Goodman et al. ............... 713/1 |
| 2005/0081203 A1 | 4/2005 | Aguilar et al. |
| 2005/0091473 A1 | 4/2005 | Aguilar et al. ................ 712/28 |
| 2005/0188372 A1 | 8/2005 | Inoue et al. ................. 718/100 |
| 2005/0188373 A1 | 8/2005 | Inoue et al. ................. 718/100 |
| 2007/0074206 A1 | 3/2007 | Iwamoto ........................ 718/1 |
| 2007/0074207 A1 | 3/2007 | Bates et al. ..................... 718/1 |
| 2007/0074212 A1 | 3/2007 | Bates et al. ................. 718/100 |
| 2007/0074221 A1 | 3/2007 | Stenson et al. .............. 718/106 |
| 2007/0083755 A1 | 4/2007 | Iwamoto ..................... 713/164 |
| 2007/0198628 A1 | 8/2007 | Bates et al. ................. 709/201 |

FOREIGN PATENT DOCUMENTS

| | | |
|---|---|---|
| EP | 0 806 730 | 11/1997 |
| GB | 2394336 | 4/2004 |
| WO | WO 97/06484 | 2/1997 |
| WO | WO 02/091180 | 11/2002 |
| WO | WO 2004/084069 | 9/2004 |

OTHER PUBLICATIONS

Pratit Santiprabhob et al. "Fuzzy Rule-Based Process Scheduling Method for Critical Distributed Computing Environment"—Proceedings 2003 IEEE, Mar. 8, 2003, vol. 5, pp. 52267-52276.

J.A. Kahle et al. "Introduction to the Cell Multiprocessor" IBM Journal of Research and Development, vol. 49, No. 4-5. Jul. 2005, pp. 589-604.

George M. Candea et al. "Vassal: Loadable Scheduler Support for Multi-Policy Scheduling" Proceedings of the Usenix Window NT Symposium, Aug. 1998, pp. 157-166.

Alexandre E. Eichenberger et al., "Optimizing Compiler for a Cell Processor", Proceedings of 14th International Conference on Parallel Architectures and Compilation Techniques, 2005 (PACT '05), pp. 161-172.

B. Flachs et al., "A Streaming Processing Unit for a Cell Processor", 2005 IEEE International Solid-State Circuits Conference- Digest of Technical Papers, pp. 134-135.

Scott Whitman, "Dynamic Load Balancing for Parallel Polygon Rendering", IEEE Computer Graphics and Applications, vol. 14, No. 4, Jul. 1994, pp. 41-48.

Jaspal Subhlok, et al., "Communication and Memory Requirements as the Basis for the Mapping Task and data Parallel Programs", Supercomputing '94, Proceedings Washington, DC, 1994 IEEE, pp. 330-339.

Alan Heinrich, "Optimal Automatic Multi-Pass Shader Partitioning by Dynamic Programming", Graphics Hardware (2005), p. 91-98.

D S Milojicic et al., "Process Migration" ACM Computing Surveys, ACM, New York, NY, US, vol. 32, No. 3, Sep. (2000-2009), pp. 241-299, XP002254767 ISSN: 0360-0300.

K Chanchio et al., "Data Collection and Restoration for Heterogeneous Process Migration" Software Practice & Experience, Wiley & Sons, Bognor Regis, GB, vol. 32, No. 9, Jul. 25, 2002, pp. 845-871, XP001115308 ISSN: 0038-0644.

Williams et al., "The Potential of the Cell Processor for Scientific Computing", Conference on Computing Frontiers, ACM, 2006, pp. 9-20.

Gschwind, "Chip Multiprocessing and the Cell Broadband Engine", Conference on Computing Frontiers, ACM, 2006, pp. 1-8.

* cited by examiner

PROCESSOR TASK AND DATA MANAGEMENT

CLAIM OF PRIORITY

This application claims the priority benefit of commonly-assigned, co-pending U.S. patent application Ser. No. 11/238,095 entitled "CELL PROCESSOR TASK AND DATA MANAGEMENT" to Richard B. Stenson and John P. Bates, filed Sep. 27, 2005, and published as U.S. Patent Application Publication number 20070074221, the entire disclosures of which are incorporated herein by reference.

CROSS-REFERENCE TO RELATED APPLICATIONS

This application is related to commonly-assigned U.S. patent application Ser. No. 11/238,077 entitled "CELL PROCESSOR METHODS AND APPARATUS" to John P. Bates, Payton R. White and Attila Vass, filed Sep. 27, 2005, and published as U.S. Patent Application number 20070074212, the entire disclosures of which are incorporated herein by reference.

This application is related to commonly-assigned U.S. patent application Ser. No. 11/238,087 entitled "SPU TASK MANAGER FOR CELL PROCESSOR" to John P. Bates, Payton R. White, Richard Stenson, Howard Berkey, Attila Vass and Mark Cerny, filed Sep. 27, 2005, and published as U.S. Patent Application number 20070074207, the entire disclosures of which are incorporated herein by reference.

This application is also related to commonly-assigned U.S. patent application Ser. No. 11/238,086 entitled "OPERATING CELL PROCESSORS OVER A NETWORK" to Tatsuya Iwamoto, filed Sep. 27, 2005, and published as U.S. Patent Application number 20070074206, the entire disclosures of which are incorporated herein by reference.

This application is also related to commonly-assigned U.S. patent application Ser. No. 11/238,085 entitled "METHOD AND SYSTEM FOR PERFORMING MEMORY COPY FUNCTION ON A CELL PROCESSOR" to Antoine Labour, John P. Bates and Richard B. Stenson, filed Sep. 27, 2005, the entire disclosures of which are incorporated herein by reference.

FIELD OF THE INVENTION

Embodiments of the present invention are directed to parallel processing and more particularly to management of processing tasks and data in a cell processor.

BACKGROUND OF THE INVENTION

Cell processors are a type of microprocessor that utilizes parallel processing. The basic configuration of a cell processor includes a "Power Processor Element" ("PPE") (sometimes called "Processing Element", or "PE"), and multiple "Synergistic Processing Elements" ("SPE"). The PPEs and SPEs are linked together by an internal high speed bus dubbed "Element Interconnect Bus" ("EIB"). Cell processors are designed to be scalable for use in applications ranging from the hand held devices to main frame computers.

A typical cell processor has one PPE and up to 8 SPE. Each SPU is typically a single chip or part of a single chip containing a main processor and a co-processor. All of the SPUs and the PPU can access a main memory, e.g., through a memory flow controller (MFC). The SPUs can perform parallel processing of operations in conjunction with a program running on the main processor. The SPUs have small local memories (typically about 256 kilobytes) that must be managed by software—code and data must be manually transferred to/from the local SPU memories. For high performance, this code and data must be managed from SPU software (PPU software involvement must be minimized). There are many techniques for managing code and data from the SPU. Often, different techniques for managing code and data from the SPU need to operate simultaneously on a cell processor. There are many programming models for SPU-driven task management. Unfortunately, no single task system is right for all applications.

Cell processors are used in applications such as vertex processing for graphics. The processed vertex data may then be passed on to a graphics card for pixel processing. In vertex processing, a cell processor may be called upon to draw a number of polygons. Each polygon is defined by three or more vertices. Handling of such vertex data may be problematic in situations where a large number of vertices need to be processed. For example, a cell processor may be called upon to draw 10,000 polygons. If each polygon requires three vertices the cell processor must process 30,000 vertices. If each vertex requires 32 bytes of data the 10,000 polygons will require 960 kilobytes. Unfortunately this is larger than the local storage capacity of a typical SPU (typically about 256 kilobytes).

Thus, there is a need in the art, for a method and system for distributing cell processor tasks and managing cell processor data in a way that addresses such problems.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Embodiments of the present invention are directed to cell processor task and data management (CTDM). In embodiments of the invention large tasks, referred to as events are managed by dividing them up into segments that can fit into the local store of a cell processor's synergistic processing elements (SPE). Each of the segments is tasked by 1 SPU at a time. Two or more segments may be associated together into one or more groups due to memory constraints on an output processor, such as a graphics card that processes the resulting output from the SPU. Each Group may therefore be regarded as the resulting output from the processing of one or more Segments by the SPU.

In embodiments of the present invention cell data management relies on the fact that SPUs can handle their own direct memory access (DMA) transfers of data in or out of local storage. CTDM can set Task commands in main memory. Semaphores may be used to lock data while writing new commands by PU and accessing data by SPUs. SPUs can pull commands from the command list through the same semaphore interface to prevent race conditions with other SPUs and PU. By allowing SPUs to pull new commands when they are done they will always remain active. This will help to ensure consistent peak efficiency even when the data varies in configuration. Commands for the output processor can be set in the command list as well. The cell processor SPUs can pull these commands through in order and pass them on to the output processor.

Figure 1:
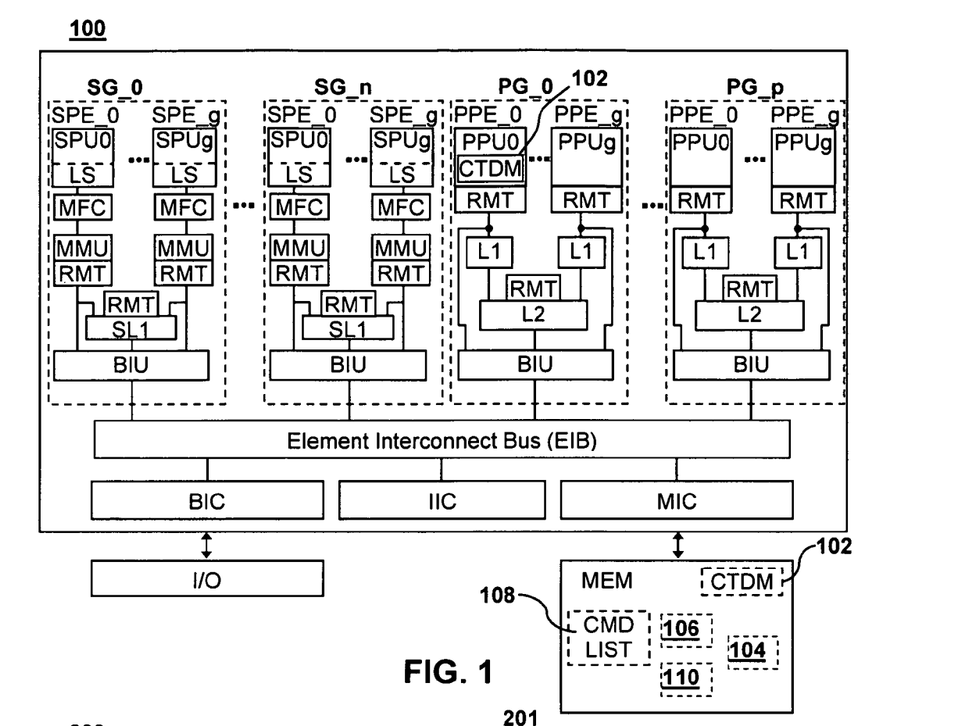
FIG. 1 is a schematic diagram of a cell broadband engine architecture implementing Cell Task and Data Management according to an embodiment of the present invention.

By way of example, and without limitation, FIG. 1 illustrates a type of cell processor 100 characterized by an architecture known as Cell Broadband engine architecture (CBEA)-compliant processor. A cell processor can include multiple groups of PPEs (PPE groups) and multiple groups of SPEs (SPE groups) as shown in this example. Alternatively, the cell processor may have only a single SPE group and a single PPE group with a single SPE and a single PPE. Hardware resources can be shared between units within a group. However, the SPEs and PPEs must appear to software as independent elements.

In the example depicted in FIG. 1, the cell processor 100 includes a number of groups of SPEs SG-0 . . . SG_n and a number of groups of PPEs PG_0 . . . PG_p. Each SPE group includes a number of SPEs SPE0 . . . SPEg. The cell processor 100 also includes a main memory MEM and an input/output function I/O.

Each PPE group includes a number of PPEs PPE_0 . . . PPE_g SPE. In this example a group of SPEs shares a single cache SL1. The cache SL1 is a first-level cache for direct memory access (DMA) transfers between local storage and main storage. Each PPE in a group has its own first level (internal) cache L1. In addition the PPEs in a group share a single second-level (external) cache L2. While caches are shown for the SPE and PPE in FIG. 1, they are optional for cell processors in general and CBEA in particular.

An Element Interconnect Bus EIB connects the various components listed above. The SPEs of each SPE group and the PPEs of each PPE group can access the EIB through bus interface units BIU. The cell processor 100 also includes two controllers typically found in a processor: a Memory Interface Controller MIC that controls the flow of data between the EIB and the main memory MEM, and a Bus Interface Controller BIC, which controls the flow of data between the I/O and the EIB. Although the requirements for the MIC, BIC, BIUs and EIB may vary widely for different implementations, those of skill in the art will be familiar their functions and circuits for implementing them.

Each SPE includes an SPU (SPU0 . . . SPUg). Each SPU in an SPE group has its own local storage area LS and a dedicated memory flow controller MFC that includes an associated memory management unit MMU that can hold and process memory-protection and access-permission information.

The PPEs may be 64-bit PowerPC Processor Units (PPUs) with associated caches. A CBEA-compliant system includes a vector multimedia extension unit in the PPE. The PPEs are general-purpose processing units, which can access system management resources (such as the memory-protection tables, for example). Hardware resources defined in the CBEA are mapped explicitly to the real address space as seen by the PPEs. Therefore, any PPE can address any of these resources directly by using an appropriate effective address value. A primary function of the PPEs is the management and allocation of tasks for the SPEs in a system.

The SPUs are less complex computational units than PPEs, in that they do not perform any system management functions. They generally have a single instruction, multiple data (SIMD) capability and typically process data and initiate any required data transfers (subject to access properties set up by a PPE) in order to perform their allocated tasks. The purpose of the SPU is to enable applications that require a higher computational unit density and can effectively use the provided instruction set. A significant number of SPUs in a system, managed by the PPEs, allow for cost-effective processing over a wide range of applications. The SPUs implement a new instruction set architecture.

MFC components are essentially the data transfer engines. The MFC provides the primary method for data transfer, protection, and synchronization between main storage of the cell processor and the local storage of an SPE. An MFC command describes the transfer to be performed. A principal architectural objective of the MFC is to perform these data transfer operations in as fast and as fair a manner as possible, thereby maximizing the overall throughput of a cell processor. Commands for transferring data are referred to as MFC DMA commands. These commands are converted into DMA transfers between the local storage domain and main storage domain.

Each MFC can typically support multiple DMA transfers at the same time and can maintain and process multiple MFC commands. In order to accomplish this, the MFC maintains and processes queues of MFC commands. The MFC can queue multiple transfer requests and issues them concurrently. Each MFC provides one queue for the associated SPU (MFC SPU command queue) and one queue for other processors and devices (MFC proxy command queue). Logically, a set of MFC queues is always associated with each SPU in a cell processor, but some implementations of the architecture can share a single physical MFC between multiple SPUs, such as an SPU group. In such cases, all the MFC facilities must appear to software as independent for each SPU. Each MFC DMA data transfer command request involves both a local storage address (LSA) and an effective address (EA). The local storage address can directly address only the local storage area of its associated SPU. The effective address has a more general application, in that it can reference main storage, including all the SPU local storage areas, if they are aliased into the real address space (that is, if MFC_SR1[D] is set to '1').

An MFC presents two types of interfaces: one to the SPUs and another to all other processors and devices in a processing group. The SPUs use a channel interface to control the MFC. In this case, code running on an SPU can only access the MFC SPU command queue for that SPU. Other processors and devices control the MFC by using memory-mapped registers. It is possible for any processor and device in the system to control an MFC and to issue MFC proxy command requests on behalf of the SPU. The MFC also supports bandwidth reservation and data synchronization features. To facilitate communication between the SPUs and/or between the SPUs and the PPU, the SPEs and PPEs may include signal notification registers that are tied to signaling events. Typically, the PPEs and SPEs are coupled by a star topology in which the PPE acts as a router to transmit messages to the SPEs. Such a topology does not provide for direct communication between SPEs. Instead each SPE and each PPE has a one-way signal notification register referred to as a mailbox. The mailbox can be used for SPE to host OS synchronization.

The IIC component manages the priority of the interrupts presented to the PPEs. The main purpose of the IIC is to allow interrupts from the other components in the processor to be handled without using the main system interrupt controller. The IIC is really a second level controller. It is intended to handle all interrupts internal to a CBEA-compliant processor or within a multiprocessor system of CBEA-compliant processors. The system interrupt controller will typically handle all interrupts external to the cell processor.

In a cell processor system, software often must first check the IIC to determine if the interrupt was sourced from an external system interrupt controller. The IIC is not intended to replace the main system interrupt controller for handling interrupts from all I/O devices.

There are two types of storage domains within the cell processor: local storage domain and main storage domain. The local storage of the SPEs exists in the local storage domain. All other facilities and memory are in the main storage domain. Local storage consists of one or more separate areas of memory storage, each one associated with a specific SPU. Each SPU can only execute instructions (including data load and data store operations) from within its own associated local storage domain. Therefore, any required data transfers to, or from, storage elsewhere in a system must always be performed by issuing an MFC DMA command to transfer data between the local storage domain (of the individual SPU) and the main storage domain, unless local storage aliasing is enabled.

An SPU program references its local storage domain using a local address. However, privileged software can allow the local storage domain of the SPU to be aliased into main storage domain by setting the D bit of the MFC_SR1 to '1'. Each local storage area is assigned a real address within the main storage domain. (A real address is either the address of a byte in the system memory, or a byte on an I/O device.) This allows privileged software to map a local storage area into the effective address space of an application to allow DMA transfers between the local storage of one SPU and the local storage of another SPU.

Other processors or devices with access to the main storage domain can directly access the local storage area, which has been aliased into the main storage domain using the effective address or I/O bus address that has been mapped through a translation method to the real address space represented by the main storage domain.

Data transfers that use the local storage area aliased in the main storage domain should do so as caching inhibited, since these accesses are not coherent with the SPU local storage accesses (that is, SPU load, store, instruction fetch) in its local storage domain. Aliasing the local storage areas into the real address space of the main storage domain allows any other processors or devices, which have access to the main storage area, direct access to local storage. However, since aliased local storage must be treated as non-cacheable, transferring a large amount of data using the PPE load and store instructions can result in poor performance. Data transfers between the local storage domain and the main storage domain should use the MFC DMA commands to avoid stalls.

The addressing of main storage in the CBEA is compatible with the addressing defined in the PowerPC Architecture. The CBEA builds upon the concepts of the PowerPC Architecture and extends them to addressing of main storage by the MFCs.

An application program executing on an SPU or in any other processor or device uses an effective address to access the main memory. The effective address is computed when the PPE performs a load, store, branch, or cache instruction, and when it fetches the next sequential instruction. An SPU program must provide the effective address as a parameter in an MFC command. The effective address is translated to a real address according to the procedures described in the overview of address translation in PowerPC Architecture, Book III. The real address is the location in main storage which is referenced by the translated effective address. Main storage is shared by all PPEs, MFCs, and I/O devices in a system. All information held in this level of storage is visible to all processors and to all devices in the system. This storage area can either be uniform in structure, or can be part of a hierarchical cache structure. Programs reference this level of storage using an effective address.

The main memory of a system typically includes both general-purpose and nonvolatile storage, as well as special-purpose hardware registers or arrays used for functions such as system configuration, data-transfer synchronization, memory-mapped I/O, and I/O subsystems. There are a number of different possible configurations for the main memory. By way of example and without limitation, Table I lists the sizes of address spaces in main memory for a particular cell processor implementation known as Cell Broadband Engine Architecture (CBEA).

TABLE I

| Address Space | Size | Description |
| --- | --- | --- |
| Real Address Space | $2^m$ bytes | where $m \leq 62$ |
| Effective Address Space | $2^{64}$ bytes | An effective address is translated to a virtual address using the segment lookaside buffer (SLB). |
| Virtual Address Space | $2^n$ bytes | where $65 \leq n \leq 80$ A virtual address is translated to a real address using the page table. |
| Real Page | $2^{12}$ bytes | |
| Virtual Page | $2^p$ bytes | where $12 \leq p \leq 28$ Up to eight page sizes can be supported simultaneously. A small 4-KB (p = 12) page is always supported. The number of large pages and their sizes are implementation-dependent. |
| Segment | $2^{28}$ bytes | The number of virtual segments is 2 (n − 28) where $65 \leq n \leq 80$ |

Note:
The values of "m," "n," and "p" are implementation-dependent.

The cell processor 100 may include an optional facility for managing critical resources within the processor and system. The resources targeted for management under the cell processor are the translation lookaside buffers (TLBs) and data and instruction caches. Management of these resources is controlled by implementation-dependent tables.

Tables for managing TLBs and caches are referred to as replacement management tables RMT, which may be associated with each MMU. Although these tables are optional, it is often useful to provide a table for each critical resource, which can be a bottleneck in the system. An SPE group may also contain an optional cache hierarchy, the SL1 caches, which represent first level caches for DMA transfers. The SL1 caches may also contain an optional RMT.

A cell processor task and data management (CTDM) program 102 may be stored in the main memory MEM and/or executed on PPU of one of the PPE groups. The CTDM program 102 divides large tasks that require more memory space than is available on a given SPE, referred to herein as processing events 104, into smaller sized chunks, referred to as segments 106.

The CTDM program 102 then builds a command list 108 containing instructions pertaining to the processing of the segments 106. Each segment 106 is characterized by a size that is less than or equal to available size in the LS of an SPE. The SPE process the segments according to the command list 108 and produce corresponding outputs which may be in the form of one or more groups 110 with each group having output produced from processing of related segments 106.

The foregoing is intended to provide an introduction and description of the terminology used in cell processor implementations. The foregoing discussion is also intended to set forth a context for data structures and methods according to embodiments of the present invention. Such embodiments are not limited to implementation on or with cell processors having the architecture described above. However, any or all of the embodiments described below may be implemented using such cell architecture as an environment in which a CTDM may be encountered and utilized.

Figure 2:
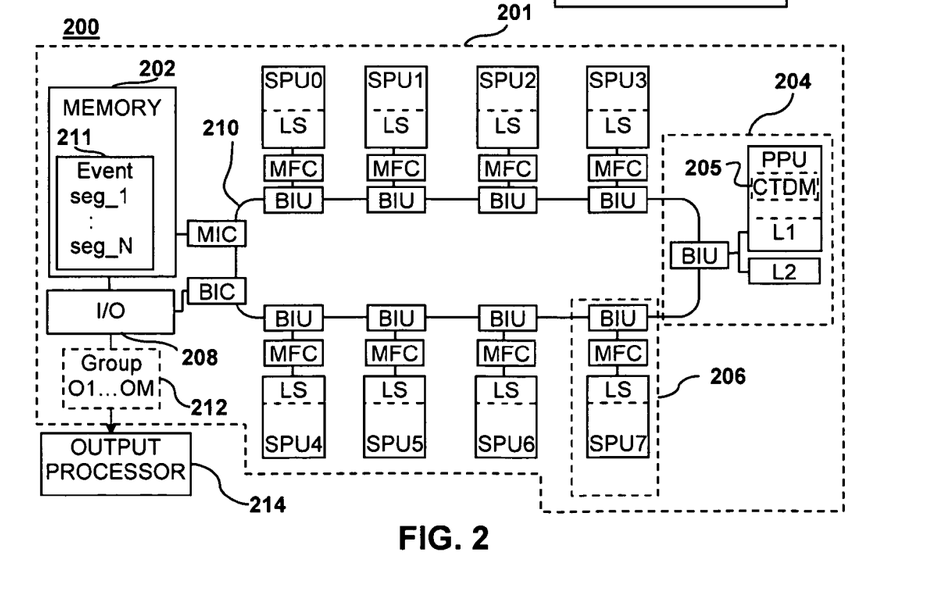
FIG. 2 is a schematic diagram of a cell processor-based system according to an embodiment of the present invention.

FIG. 2 depicts an example of a cell processor-based system 200 configured to implement CTDM according to an embodiment of the present invention. For the purposes of illustration, the system includes a cell processor 201 and an output processor 214. The cell processor 201 includes a main memory 202, a single PPE 204 and eight SPEs 206. However, the cell processor 201 may be configured with any number of SPE's. With respect to FIG. 2, the memory, PPE, and SPEs can communicate with each other and with an I/O device 208 over a ring-type element interconnect bus 210.

The CTDM program 205 may use semaphores to lock data while the PPE 204 writes new commands and the SPU access data. The SPUs pull commands from a command list 211 in main memory 202 though the same semaphore interface to prevent race conditions with other SPUs and PPE 204. By allowing SPUs to pull new commands when they are done they will always remain active. This will help to ensure consistent peak efficiency even when the data varies in configuration. The command list 211 may also contain commands for the output processor 214. The SPUs of the cell processor 201 can pull these commands through in order as a group 212 and pass them on to the output processor 214.

The output processor 214 processes the groups from the cell processor 201. The size of the groups is generally determined by a target input size for the output processor. For example, the output processor may have an I/O buffer that can handle 512 kilobytes of data while each output segment is only 32 kilobytes. Thus each output group might contain 16 output segments.

By way of example the system 200 can be used in a Graphics API that is flexible, efficient, and easy to use. In such a case, the output processor 214 may be a graphics card, such as Model NV40, NV45, or NV47 available from Nvidia Corporation of Santa Clara Calif.

The PPE 204 executes a CTDM program 205 that manages SPU tasks and data as discussed below. Preferably, the CTDM program 205 is flexible enough to handle small and large small events. It is also desirable for the CTDM program 205 to be efficient in its management of those events on the SPUs and output processor. It is also desirable for the CTDM program 205 to ensure efficiency by extending the system 200 to support deferred processing for streaming data.

Figure 3A:
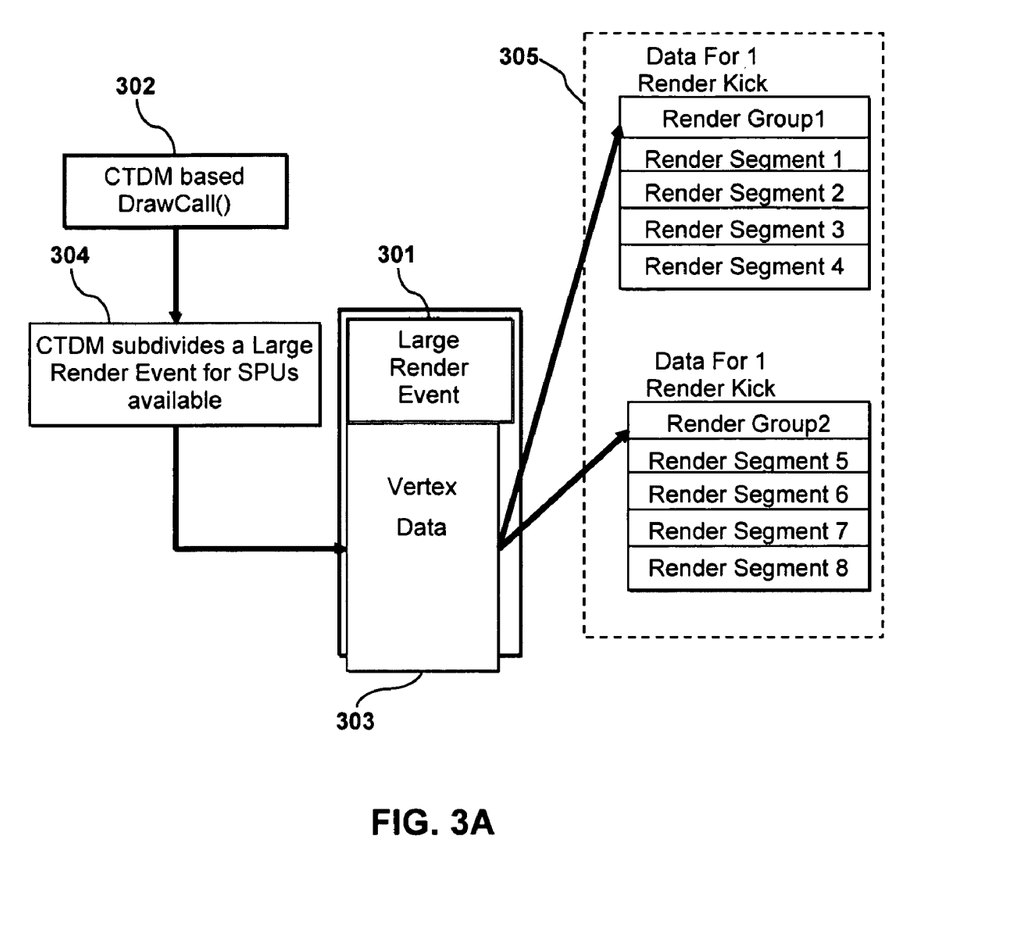
FIG. 3A is a block diagram illustrating division of a large render event according to an embodiment of the present invention.

To illustrate the importance of such flexibility and efficiency, reference will be made to an example wherein the event is a large render event 301 for vertex data 303 that is to be processed by the cell processor 201 before being sent to a graphics card for further processing, e.g., pixel processing such as shading. Such shading may be accomplished with well-known shading software, such as CG. FIG. 3A illustrates the processing of a CTDM-based render event in the form of a Draw Call 302. Such a render event may involve translating, rotating or changing the view of a video game character represented by a set of vertices. In the example depicted in FIG. 3A, the Draw Call 302 is an instruction to process a large amount of vertex data, i.e., more than can be processed by one SPU at one time.

At 304 the CTDM program subdivides the large render event 301 into a number of segments and associates subsets of these segments into groups. Specifically, Segments 1 through 4 are associated into Group 1 and Segments 5 through 8 are associated into Group 2. The CTDM program 205 distributes these segments among the available SPU of the cell processor 201. The distribution of the segments to the SPU is dependent on SPU availability. Logically separating the vertex data 303 in the event 301 into segments, one segment for a single SPU Task, and then combining the segments into Render Groups represents data for 1 SPU parallel job. Such separation of tasks allows for parallel tasking and also accommodation of the limited memory available on a single SPU.

To efficiently distribute the segments among the available SPU without burdening the PPE 204 the CTDM program creates the command list 305. The command list provides addresses for the code for the SPU to perform the necessary rendering of the vertex data as well as addresses for the requisite data for each segment. The SPU can then access the code and data as they become available. The SPU process the vertex data in each segment in parallel and pass the resulting output data to the output processor (graphics card) 214. Commands for the Graphics Card 214 are also set in the command list 305. The SPUs of the cell processor 201 can simply pull them through in order and pass them on to the Graphics Card 214. For example, once the last segment in a group has been passed to the graphics card, the SPU that passed that data may pull "kick" command that instructs the graphics card to begin processing the group.

Figure 3B:
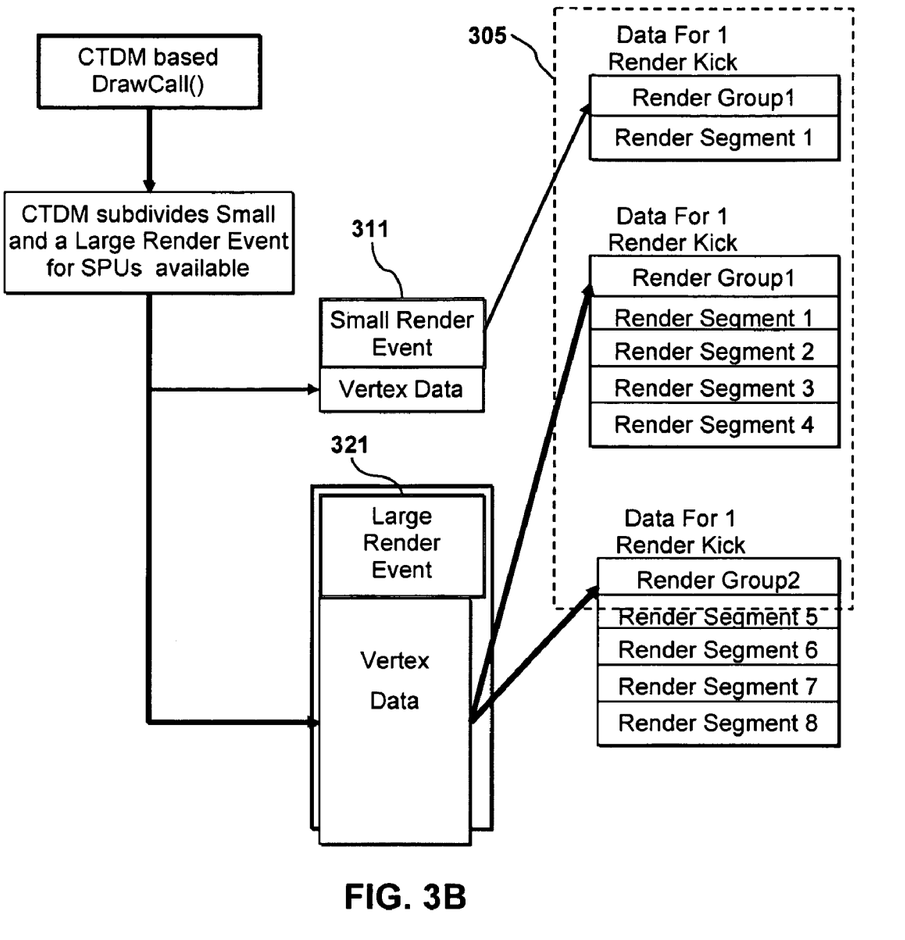
FIG. 3B is a block diagram illustrating division of a large and a small render event according to an embodiment of the present invention.

FIG. 3B illustrates CTDM-based processing of a small render event 311 and a large render event 321. Here there was only enough data for one SPU Task from the Small Event 311 so only one SPU is used. In this case, the output group contains the output from processing only one segment. The large event 321 is divided into two groups of four segments each and part of its data can be set to run on 4 SPUs in Parallel with the one processing the Small Render Event 311. This way one small Event with relatively little data doesn't stall the system 200 and every SPU can task as much data per DMA transfer as it can handle. This would not be the case if the Small Event was divided among SPUs.

Figure 4A:
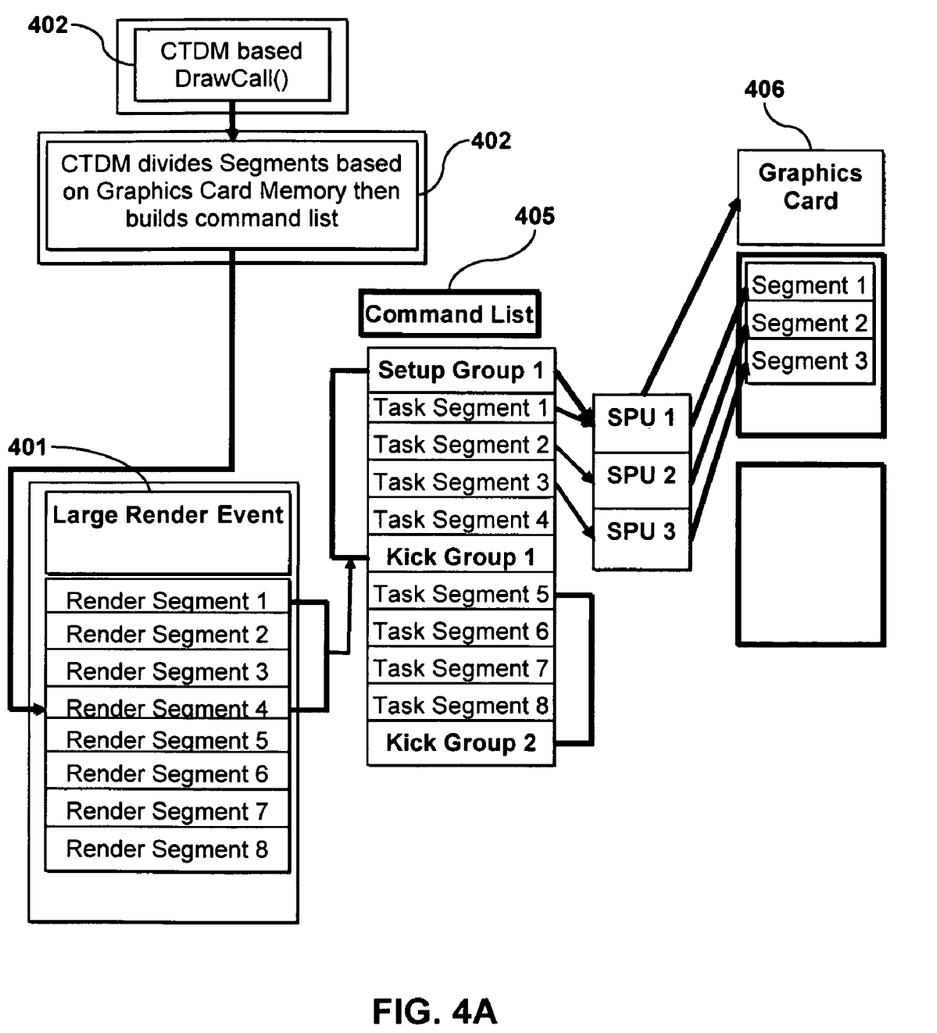
FIGS. 4A-4C are a sequence block diagrams illustrating processing of an event according to an embodiment of the present invention.
Figure 4B:
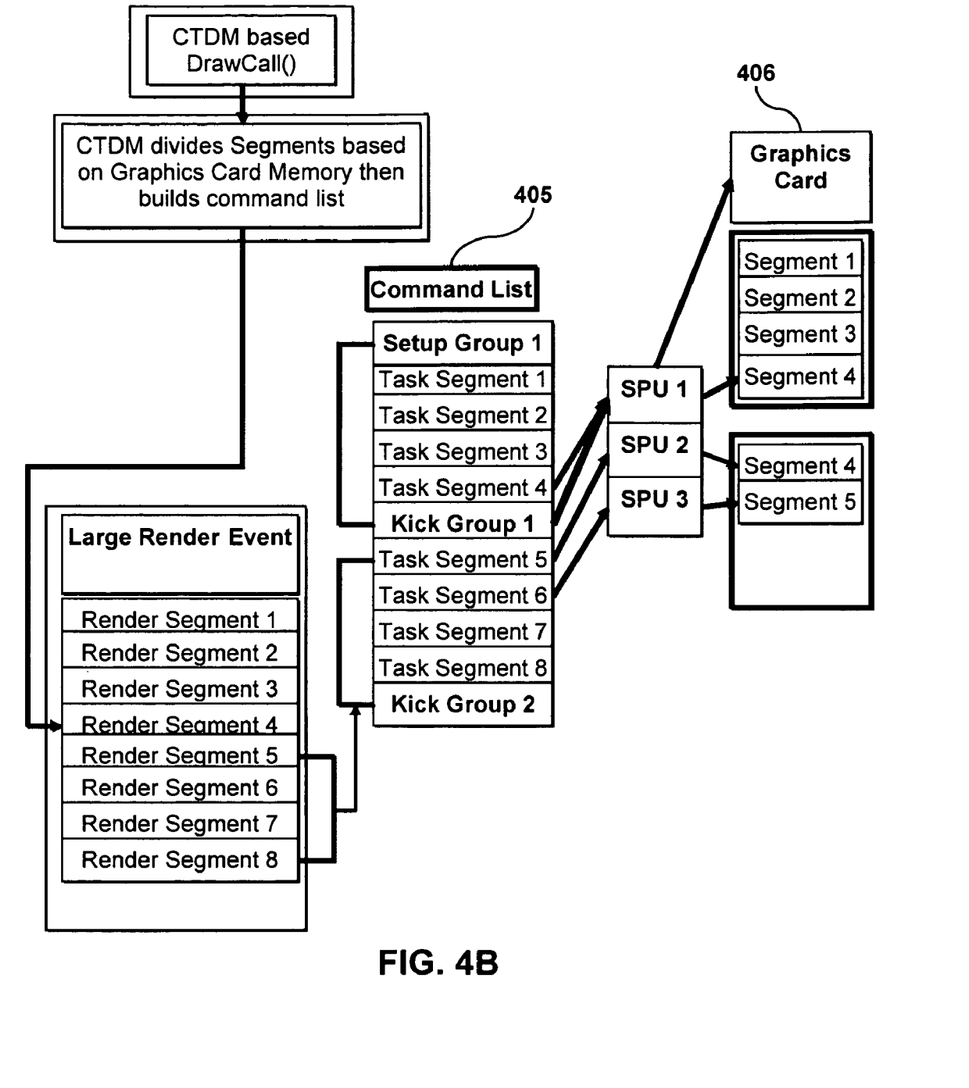
Figure 4C:
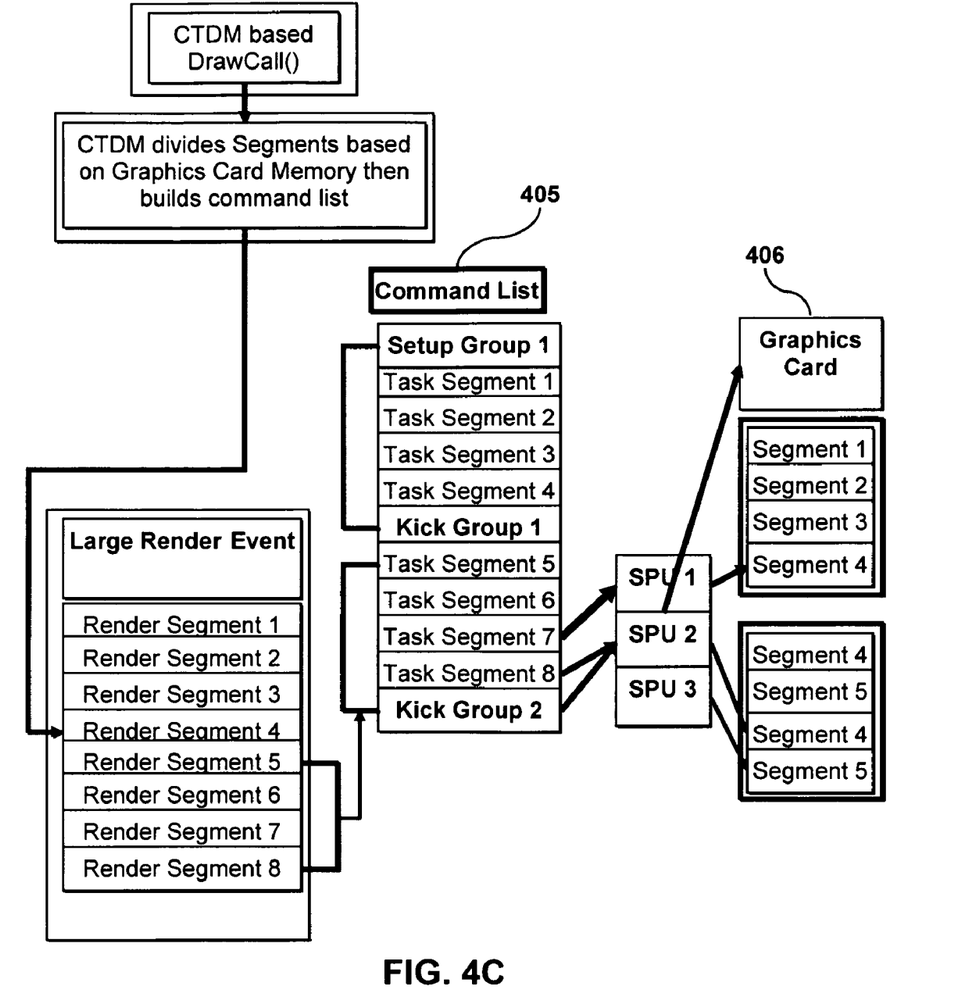

The distribution of segments amongst the SPU is generally most efficient if the number of available SPU is the same as the number of segments. This is not always possible, so the CTDM program 205 allows the available SPU to parallel process large events that have more segments than available SPUs. FIGS. 4A-4C illustrate an example of such a parallel processing. Again, a vertex draw call for a graphics API is illustrated for the purpose of example. Specifically, as shown in FIG. 4A, in response to a Draw Call 402, the CTDM program 205 divides a large render event 401 into 8 render segments and generates a command list 405 that tells the SPU where to find the code and data for processing the segments. Due to limitations of a graphics card 406 the segments are divided into two groups.

In this example, it is assumed that only three SPU are available for processing the render event 401. SPU1 takes the first command from the command list 405, which is a setup command for group 1. The setup command contains a list of any special data associated with this particular group that needs to be passed on to any other processor that needs to know details about the group. In the case of a graphics example, such special data may include textures and render states such as lights and transformations that are not necessarily needed by the SPU segments to be processed, but are needed by the resulting graphics card or other processor that is waiting for the output of the SPU segment data that is in that group. SPU1, SPU2 and SPU3 then take tasks for segments 1, 2 and 3. These task commands tell the SPU where to find the data and code for processing it. If an SPU already has the necessary code loaded in its local store it can skip loading the code. After processing segments 1, 2 and 3, the SPU transfer the resulting output to the graphics card 406. However, since not all of group 1 has been processed the graphics card 406 does not yet begin processing them. However, since SPU1, SPU2 and SPU3 are finished with processing segments 1, 2 and 3 they are available for other tasks.

As shown in FIG. 4B, SPU1 processes task segment 4 and, after doing so, pulls the kick command for group 1 and passes it on to the graphics card 406, which begins processing group 1. Meanwhile, SPU2 and SPU3 have pulled task segments 5 and 6 respectively and begin processing them. Once task segments 5 and 6 and complete the resulting output is passed to a buffer on the graphics card 406 to await processing when group 2 is ready.

As shown in FIG. 4C SPU1 pulls task segment 7 and SPU2 pulls task segment 8. When processing of these task segments is complete, the corresponding outputs of these segments are transferred to the buffer on the graphics card 406. Since SPU2 pulled task segment 8, the last segment in group 2, SPU2 next pulls the group 2 kick command, which is passed on to the graphics card 406 after DMA has been completed for segment 8.

It should be noted that in this example, the task segments were processed in order. This is not strictly necessary. However, to ensure efficient operation, it is desirable for the SPU keep track of which task has been completed and which has not. That way, the SPU processing the last unprocessed task segment of a group can determine that it must send the kick command to the graphics card. To this end it is desirable for the cell processor 201 to include in memory 202 a notification board. By routinely querying and updating the notification board, the SPU can determine whether additional segments require processing and/or whether a particular group is done. The notification board could be organized as shown in Table II below.

TABLE II

| WHO | STATUS | TASK | GROUP | GROUP STATUS |
| --- | --- | --- | --- | --- |
| SPU1 | Done | Segment 4 | 1 | Done |
| SPU2 | Working | Segment 5 | 2 | Not Done |
| SPU3 | Working | Segment 6 | 2 | Not Done |
| NONE | Waiting | Segment 7 | 2 | Not Done |
| NONE | Waiting | Segment 8 | 2 | Not Done |

TABLE II-continued

| WHO | STATUS | TASK | GROUP | GROUP STATUS |
| --- | --- | --- | --- | --- |
| NONE | Done | Segment 1 | 1 | Done |
| NONE | Done | Segment 2 | 1 | Done |
| NONE | Done | Segment 3 | 1 | Done |

Table I represents a snapshot of the process as shown in FIG. 4B. Specifically, Tasks 1, 2, 3 and 4 have been completed and group 1 is now done. Segment 8 still awaits processing. The "done" in the group status column for SPU1 indicates to SPU1 that it must issue the "kick group 1" command to the graphics card 406. The value "none" in the "who" column for tasks 1, 2 and 3 column indicates that no SPU is working on these tasks since they are done. Similarly, the "none" in the "who" column for tasks 7 and 8 indicates that no SPU is working on these tasks since they have not yet been processed, as indicated by the "waiting" value in the "status" column.

Figure 5:
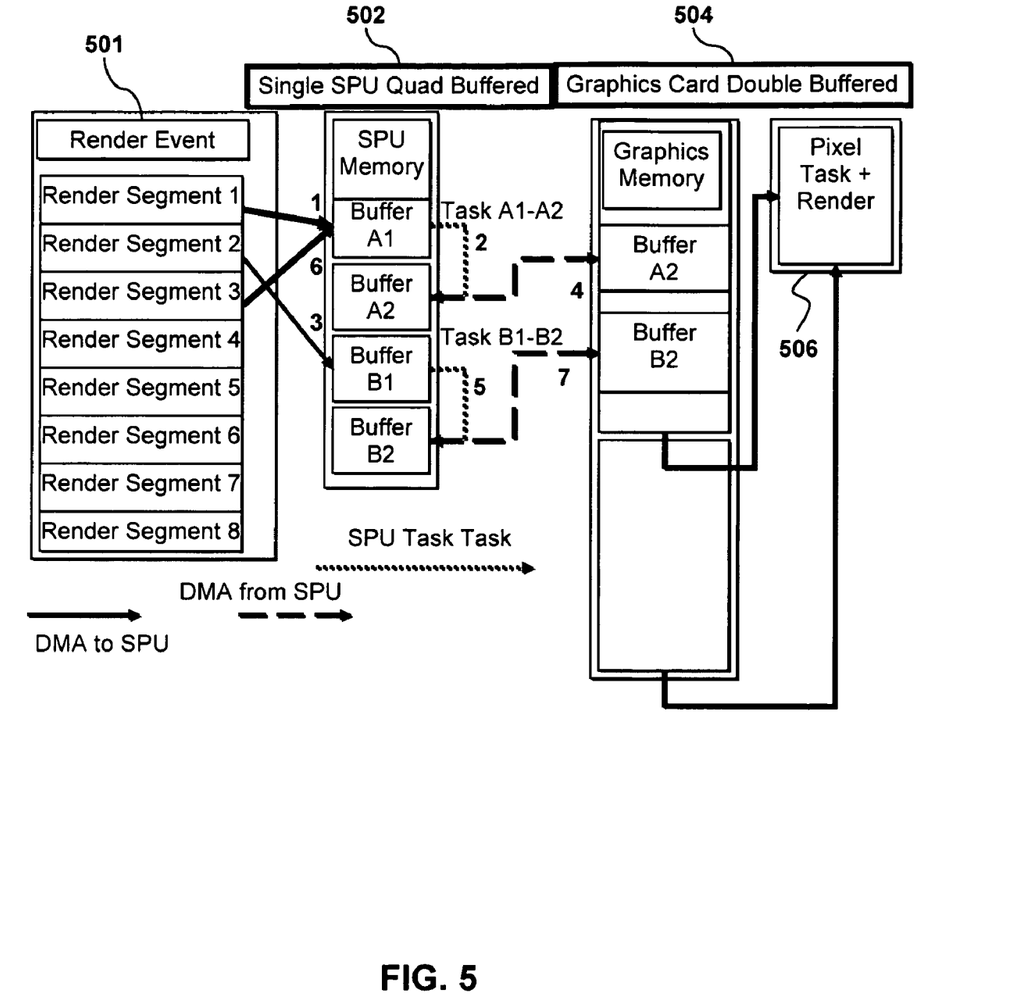
FIG. 5 is a block diagram illustrating buffering of segments and groups according to an embodiment of the present invention.

In a cell processor each SPU can process data while simultaneously transferring other data into or out of local storage. To facilitate efficient processing of the task segments by the SPU it is desirable to take advantage of this capability by buffering the data in the task segments. FIG. 5 illustrates one possible example, among others, of how such buffering might work. In this example, a large render event 501 has been divided into 8 segments of vertex data for processing on a cell processor. By way of example, and without limitation, an SPU 502 on the cell processor may do Quad buffering of the segments to allow for interleaved SPU task tasking and DMA transfers. The resulting vertex data that are output from the SPU 502 are double buffered in a graphics card memory 504 in one or more groups. Alternatively, ring buffering may be used on the graphics card memory 504.

Buffering of the render segments may proceed in the following order. As indicated at 1, Render segment 1 is loaded into buffer A1 of the SPU local storage. This task data is processed and the resulting output is stored in buffer A2 of the SPU local storage as indicated at 2. While render segment 1 is being processed by the SPU 502, render segment 3 can be loaded into buffer B1, e.g., by direct memory access (DMA) as indicated at 3. When the SPU 502 is finished processing render segment 1, the corresponding output is transferred to buffer A2 of the graphics card memory 504 as indicated at 4. While the output from segment 1 is being transferred, the SPU 502 can process render segment 2 and store the resulting output in buffer B2 as indicated at 5. While the SPU 502 processes render segment 2, render segment 3 can be transferred by DMA to buffer A1 as indicated at 6. If the SPU 502 is finished processing render segment 2, it can transfer the resulting output to buffer B2 of the graphics card memory 504 as render segment 3 is being loaded into buffer A1. Once the graphics card memory 504 contains a full group, the group of vertex data can be passed on to the graphics processor 506, e.g., for pixel processing such as shading.

Figure 6A:
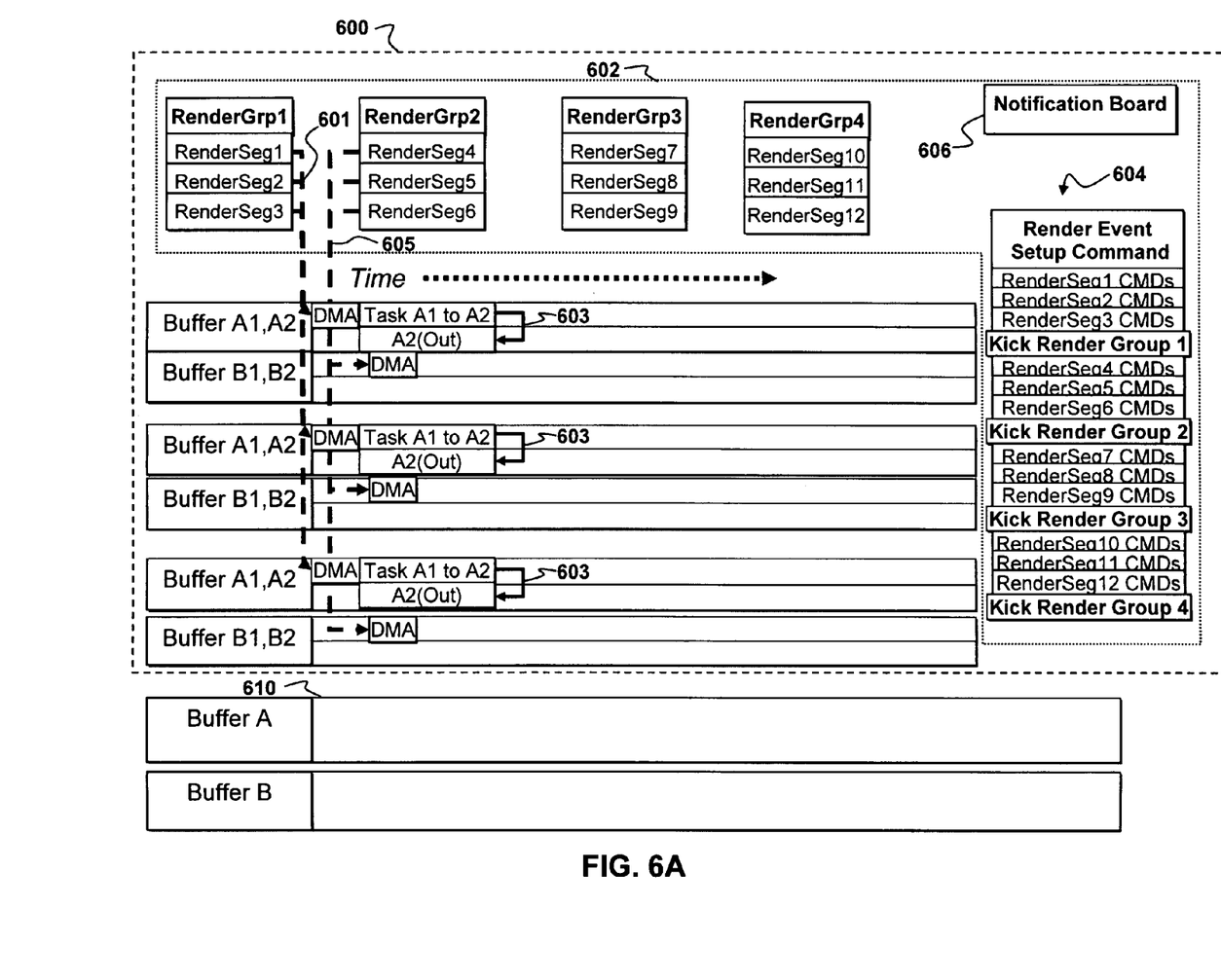
FIGS. 6A-6B are a sequence of block diagrams illustrating processing of an event in a cell-based processor system according to an embodiment of the present invention.
Figure 6B:
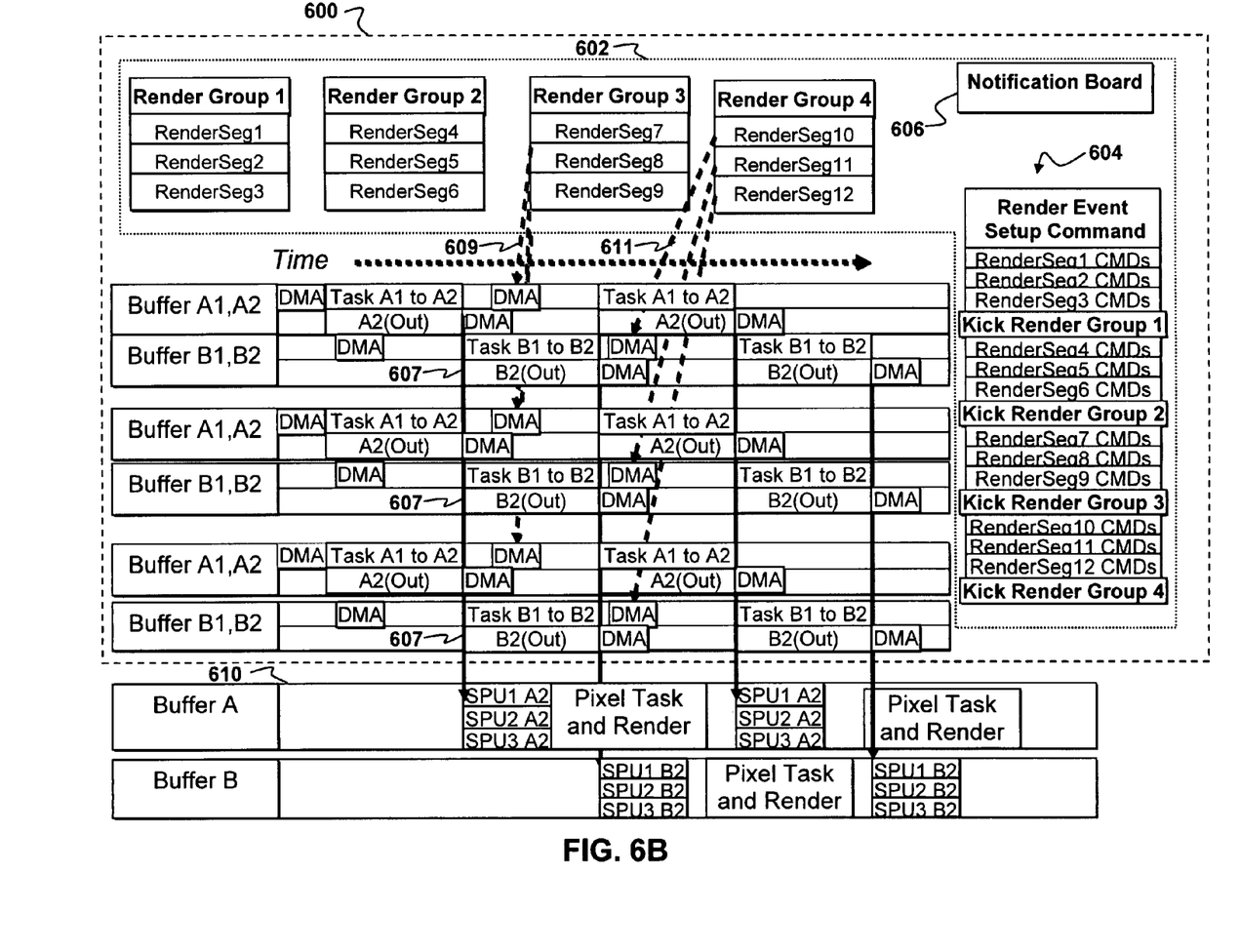

FIG. 5 shows how segments are buffered into and out of a single SPU. To take full advantage of the computational efficiency inherent in cell processors, it is desirable to process segments in parallel on multiple SPU. Such parallel processing is included within the scope of embodiments of the present invention. For example, the diagrams depicted in FIGS. 6A-6B illustrate how 3 SPUs that can do parallel processing of render event data organized into 4 Render Groups for 4 Parallel Jobs. The render groups are organized in the main memory 602 of a cell processor 600. The main memory 602 may further include a command list 604 that lists the various commands necessary for performing the render event. These commands include a render event setup command, render commands for each segment and kick render commands for each group, which may be implemented as discussed above. The memory 604 may further contain a notification board 606 of the type described above.

First, as shown in FIG. 6A Segments 1, 2 and 3 of Render Group 1 are DMA transferred by SPU1, SPU2 and SPU3 into their respective buffers A1 as indicated by the dashed arrows at 601. Then SPU1, SPU2 and SPU3 vertex process segments 1, 2 and 3 from buffer A1 to Buffer A2 as indicated by the solid arrows at 603. In this process the segment data stored in buffer A1 is processed and the resulting output is stored in buffer A2. While the vertex Tasking 603 is going on Segments 4, 5 and 6 of Render Group 2 are transferred by DMA to B1 SPU buffers as indicated by the dashed arrows at 605. At this point the notification board 606 may be represented as shown in Table III.

TABLE III

| WHO | TASK STATUS | TASK | GROUP | GROUP STATUS |
| --- | --- | --- | --- | --- |
| SPU1 | Working | Segment 1 | 1 | Not Done |
| SPU2 | Working | Segment 2 | 1 | Not Done |
| SPU3 | Working | Segment 3 | 1 | Not Done |
| SPU1 | Working | Segment 4 | 2 | Not Done |
| SPU2 | Working | Segment 5 | 2 | Not Done |
| SPU3 | Working | Segment 6 | 2 | Not Done |
| NONE | Waiting | Segment 7 | 3 | Not Done |
| NONE | Waiting | Segment 8 | 3 | Not Done |
| NONE | Waiting | Segment 9 | 3 | Not Done |
| NONE | Waiting | Segment 10 | 4 | Not Done |
| NONE | Waiting | Segment 11 | 4 | Not Done |
| NONE | Waiting | Segment 12 | 4 | Not Done |

In this example, the "working" status applies to any task segment that has been loaded into an SPU whether it is being processed by the SPU or not.

Once buffer A1, A2 tasking is done on SPU1, SPU2 and SPU3 the resulting output data can be sent to the Graphics Card by DMA as indicated by the solid arrows at 607 in FIG. 6B. If the Graphics Card's current buffer contains a completed group it can process the completed group, e.g., by doing pixel tasking and rendering of the group vertex data. For example, the SPU that finishes the last segment in group 1 passes the kick render group 1 command from the command list The SPUs can continue to do more Render Groups and DMA transfer data to the buffer B of the graphics processor 610. For example while tasking segments 4, 5, and 6 from B1 to B2 buffers, SPU1, SPU2 and SPU3 may respectively DMA transfer segments 7, 8 and 9 into their A1 buffers as indicated by the dashed arrows at 609. When segments 4, 5 and 6 are finished processing the resulting outputs may be transferred to the Graphics Card's buffer B and process segments 6, 7 and 8. While SPU1, SPU2 and SPU3 process these segments, they may DMA transfer segments 10, 11 and 12 into their B1 buffers as indicated by the dashed arrows at 611. At this point the notification board 606 may be represented as shown in Table IV.

TABLE IV

| WHO | TASK STATUS | TASK | GROUP | GROUP STATUS |
| --- | --- | --- | --- | --- |
| SPU1 | Done | Segment 1 | 1 | Done |
| SPU2 | Done | Segment 2 | 1 | Done |
| SPU3 | Done | Segment 3 | 1 | Done |
| SPU1 | Done | Segment 4 | 2 | Done |
| SPU2 | Done | Segment 5 | 2 | Done |
| SPU3 | Done | Segment 6 | 2 | Done |
| SPU1 | Working | Segment 7 | 3 | Not Done |
| SPU2 | Working | Segment 8 | 3 | Not Done |
| SPU3 | Working | Segment 9 | 3 | Not Done |
| SPU1 | Working | Segment 10 | 4 | Not Done |
| SPU2 | Working | Segment 11 | 4 | Not Done |
| SPU3 | Working | Segment 12 | 4 | Not Done |

Note that in this example, the "who" column of the notification board retains the identity of the SPU that processed a segment after processing is complete.

Note also that for the sake of simplicity this example shows SPUs filling up Graphics Card buffers one SPU Task pass. In actual practice it might take several render groups to complete one Render Event.

In the foregoing discussions it has been stated that large events are divided into segments. The size of these segments depends partly on the event size and the available storage in an SPU. Part of the process of dividing a large event into segments involves determining the size and number of these segments. A numerical example is helpful to illustrate how this is done. By way of example and without limitations suppose that a "Processing Event" with a large amount of data pasted to the CELL Process and Data Manager to be processes has the following attributes:

1. SPU CTDM Loader Program occupies 16 kilobytes (16*1024 bytes).
2. The vertex process requires two SPU process programs each taking up 20 kilobytes.
3. The total amount of Data in the event is 1 MegaByte. (1*1024*1024 bytes)
4. Each individual input element is 32 bytes (this could be a vertex, just a set of xyz vectors, or something else all together)
5. Each individual output element is 48 bytes (this is the output vertex, just a set processed vector, or something else as well)
6. The size of SPU local store is 256 kilobytes (256*1024 bytes)

In general, the process event will include other information, such as the memory location of the original data, the memory location of where the data needs to go and other "Process Event" specific data that needs to be kept associated with the output. Such information may be regarded as a black box of event-specific data. However, these have not been included in this example for the sake of simplicity.

The CTDM program evaluates the Process Event based on these arbitrary parameter constraints in the SPU. In this example, it is assumed that the SPU will use quad buffering, however the CTDM SPU memory configuration is flexible and could support a triple or ring buffer configuration as well as the quad buffering that is described here.

First, CTDM determines the space taken up by the programs, which include 16K for CTDM SPU Loader+20K for Process Program 1+20 k Process Program 2=(56K for Programs including the Loader.) Subtracting this 56K from the 256K local store leaves 200K available for buffers. Since there will be four buffers this leaves 200K/4 buffers=50 K per buffer.

The CTDM program must ensure that the inputs and outputs of a segment will fit in a 50 K buffer. It is generally desirable to provide sufficient space for both input and output when the size of the output is larger than the size of the input data. In this case the output data cannot be written directly over the input data that is already in place. Also if there are interdependencies in the data where some parts of the data might be needed to complete the full calculation. Examples of such interdependencies occur, e.g., in spline-based surface generation or polygon-based subdivision surface calculation where all the vertex points can have an effect on every single output. In such cases the input data cannot be over written during the calculation. If there aren't any interdependencies and the input data is larger or the same size as the output only one buffer is needed that would serve as both the input and output buffer. CTDM can handle this case as well.

By way of example, the CTDM may create segments of data based on the following calculation:

```
SPUIOBufferSize = 51200 bytes; ( 50 * 1024bytes ) ( SPU Input + Output
buffer size)
InputElementSize = 32 bytes; ( Item 4 above; )
OutputElementSize = 48 bytes ; ( Item 5 above)
// Need to first find out how many full elements can fit into one buffer
input + output.
NbrOfElementsPerSegment = SPUIOBufferSize / ( InputElementSize +
OutputElementSize )
NbrOfElementsPerSegment = 640;
ActualSegmentSize = NbrOfElementsPerSegment * (InputElementSize +
OutputElementSize)
//In this case the actual size is the same size as the buffer, but most of the
time this will not be
the case
ActualSegmentSize = 50k (or 51200bytes) ;
NbrOfSegments = TotalDataSize / ActualSegmentSize;
NbrOfSegments = 1*1024bytes*1024bytes/ 51200bytes;
NbrOfSegments = 20; // this in an integer variable. The remainder is
truncated
// If there is a remainder then we need to add one more segment for the
remainder to be processed. The following code determines if there is a
remainder and adds one more segment for that remaining data.
if ( TotalDataSize % ActualSegmentSize ) // the % is called a modulus and
is returns the remainder of an integer divide
    NbrOfSegments = NbrOfSegments + 1;
NbrOfSegments = 21;
```

It will take 21, (actually (20.48)) segments of data given the configuration above of the SPU and the input and output data sizes by the CTDM to process the 1 megabyte of data dynamically on the SPU. Note though that the above calculation does not consider the grouping of the segments because it is basically not relevant to the SPU segment generation. The grouping comes as a second calculation given the output target's limitations. For instance there might be only a 256 k buffer to put data in coming form the SPU. This calculation involves very similar math, but takes into account different parameters.

```
TargetDataSize = 256k; ( 256 * 1024bytes )
// to determine how many segments go in to a group we only need the
output sizes because that is all that is going to the Target Ouput of the
Graphics Card memory buffer for example.
NbrGroups = TargetDataSize / (NbrOfElementsPerSegment *
OutputElementSize) ; (output elements size from item 5 above)
NbrGroups = 262144bytes / (640 * 48 bytes);
NbrGroups = 8; // remainder is truncated
// As in the segment number calculation CTDM checks for a remainder
and adds another group if needed:
if (TargetDataSize % (NbrOfElementsPerSegment*OutputElementSize))
    NbrGroups = NbrGroups + 1;
```

As can be seen from the above calculations, 9 groups of segments of data are required for the CTDM to process 1 megabyte of data dynamically on the SPU given the above SPU memory constraints and the input and output data sizes.

The above-described process is referred to herein as the "Data Delegation" portion of the CTDM.

Those of skill in the art will recognize that many variations are possible on the embodiments set forth herein. For example different numbers of SPUs may be used or multiple groups of SPU and PPE may be used depending on the cell architecture. Furthermore, although the above discussion mentions vertex processing on a cell processor in conjunction with pixel processing on a graphics card, the embodiments of the invention are in no way limited to such applications. Those of skill in the art will be able to devise many other different applications of cell task and data management consistent with the teachings herein.

Also embodiments of CTDM don't necessarily have to reside on a PPU. Instead CTDM may be run in a special capacity on an SPE (referred to as a Data Management SPE). Such a configuration could potentially be more efficient in some cases as it would allow for the PPU to continue almost completely uninterrupted except for tasking the predetermined "Data Management SPE" with the overall processing Event. The PPU would not have to deal with delegation of processes into Segments and Groups for each SPE. The Data Management SPU could signal the PPU when the overall Processing Event is complete, including all segments and groups. The Data Management SPE could also update a completion key for that overall event allowing the PPU to check that key for completion at its leisure. These two possibilities would allow for efficient notification for both Processing Events with both large and small amounts of data associated with them.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for processor task and data management in a system having a main processor and one or more co-processors, comprising the steps of:
    dividing a processor event into two or more segments, wherein the event requires more memory space than is available in a local storage of one of the co-processors, and wherein each segment has a segment size that is less than or the same as an amount of memory space available in the local storage;
    building a command list, wherein the command list includes instructions for processing the one or more segments; and
    processing the two or more segments with one or more of the co-processors to produce two or more corresponding outputs, wherein processing the two or more segments includes pulling one or more commands from the command list.

2. The method of claim 1 wherein processing the two or more segments includes quad buffering the segments and corresponding outputs.

3. The method of claim 1 wherein the segment size is less than or equal to a local store buffer size.

4. The method of claim 1 wherein dividing the cell processor event into two or more segments includes determining the segment size based on a local store buffer size, an event size an input element size and an output element size.

5. The method of claim 1 wherein dividing the cell processor event into two or more segments includes determining a number of segments into which to divide the processor event based on a total event size and the segment size.

6. The method of claim 1, further comprising associating the two or more outputs into one or more groups.

7. The method of claim 6 wherein each group requires an amount of memory that is less than or equal to a target data size associated with a subsequent process.

8. The method of claim 6 wherein associating the two or more outputs into one or more groups includes calculating a number of groups based on a number of elements per segment, an output element size and a target data size associated with a subsequent process.

9. The method of claim 6, further comprising using the groups as input for another processor.

10. The method of claim 9 wherein the other processor is a graphics card.

11. The method of claim 6 wherein processing the two or more segments includes checking a notification board to determine whether all the segments in a group have finished processing.

12. The method of claim 1 wherein the processor event is a vertex rendering event.

13. The method of claim 1, further comprising associating the two or more outputs into one or more groups, wherein each group is less than or equal to a target data size associated with a subsequent process.

14. The method of claim 13 wherein the subsequent process includes performing the process on a group of one or more segments stored in a first buffer while loading another group into a second buffer.

15. The method of claim 13 wherein the processor event is a vertex rendering event and the subsequent process is a pixel rendering event.

16. The method of claim 13 wherein the pixel rendering event includes a pixel shading process.

17. The method of claim 1 wherein processing the two or more segments with one or more of the co-processors includes processing a first segment on a first co-processor and processing a second segment on a second co-processor.

18. The method of claim 1 further comprising associating the two or more outputs into one or more groups, wherein each group is less than or equal to a target data size associated with a subsequent process, wherein processing the two or more segments with one or more of the co-processors includes processing each segment in a group with a different co-processor.

19. The method of claim 1 wherein processing the two or more segments with one or more SPE includes loading a segment into a buffer and processing the segment while transferring another segment into and/or out of one or more other buffers.

20. A processor system having a main processor, one or more co-processors and a main memory coupled to the main processor and one or more co-processors, wherein each co-processor includes a processing unit and a local store, the main memory having embodied therein data and/or code representing an event that requires more memory space than is available in the local storage of a co-processor, the processor system being configured to execute processor readable instructions for implementing a task and data management method, the method comprising the steps of:
    dividing a processor event into two or more segments, wherein each segment has a segment size that is less than or the same as an amount of memory space available in the local store;
    building a command list, wherein the command list includes instructions for processing the one or more segments; and
    processing the two or more segments with one or more of the co-processors to produce two or more corresponding outputs, wherein processing the two or more segments includes pulling one or more commands from the command list.

21. The system of claim 20 wherein dividing the processor event into two or more segments includes calculating the segment size based on a local store buffer size, an event size an input element size and an output element size.

22. The system of claim 20 wherein dividing the processor event into two or more segments includes determining a number of segments into which to divide the processor event based on a total event size and the segment size.

23. The system claim 20, wherein the command list is embodied in the main memory.

24. The system of claim 20 wherein the one or more commands includes a kick command, wherein the kick command instructs another processor to begin processing a group containing the two or more corresponding outputs.

25. The system of claim 24 wherein the subsequent processor is a graphics card.

26. The system of claim 20 wherein one or more co-processors are configured to load a segment into a buffer and processing the segment while transferring another segment into and/or out of one or more other buffers.

27. The system of claim 20, further comprising a notification board embodied in the main memory, wherein the notification board stores information relating to a status of one or more of the segments.

28. The system of claim 20 wherein the two or more outputs are associated into one or more groups, wherein each group is less than or equal to a target data size associated with a subsequent process, wherein processing the two or more segments with one or more co-processors includes processing each segment in a group with a different co-processor.

29. The system of claim 20 wherein the event is a vertex rendering event.

30. The system of claim 20 wherein the processor readable instructions for implementing a task and data management method are embodied in the local storage of a selected one of the co-processors, whereby the selected co-processor acts as a Data Management co-processor.

31. A processor system, comprising:
    a main memory;
    a main processor coupled to the main memory;
    one or more co-processors coupled to the main memory, wherein each co-processor includes a processing unit and a local store;
    an output processor coupled to the cell processor such that the output processor can process output produced by the cell processor; and
    a set of processor readable instructions in the main memory and/or local store of one or more of the co-processors, the instructions being configured implement a task and data management method, the method comprising the steps of:
        dividing a processor event into two or more segments, wherein each segment has a segment size that is less than or the same as an amount of memory space available in the local store;

building a command list, wherein the command list includes instructions for processing the one or more segments;

processing the two or more segments with one or more of the co-processors to produce two or more corresponding outputs, wherein processing the two or more segments includes pulling one or more commands from the command list;

transferring the two or more corresponding outputs to the output processor; and processing the two or more corresponding outputs with the output processor.

32. The system of claim 31 wherein dividing the processor event into two or more segments includes calculating the segment size based on a local store buffer size, an event size an input element size and an output element size.

33. The system of claim 31 wherein dividing the processor event into two or more segments includes determining a number of segments into which to divide the processor event based on a total event size and the segment size.

34. The system of claim 31 wherein the event is a vertex processing event.

35. The system of claim 31 wherein the output processor is a graphics card.

36. The system of claim 31 wherein the command list is embodied in the main memory.

37. The system of claim 31 wherein the one or more commands includes a kick command, wherein the kick command instructs the output processor to begin processing a group containing the two or more corresponding outputs.

38. The system of claim 31 wherein the two or more outputs are associated into a group that requires an amount of memory that is less than or equal to a target data size associated with a subsequent process executed by the output processor.

39. The system of claim 31 wherein the event is a vertex processing event, wherein processing the two or more segments includes performing a vertex transformation on vertex data, and wherein processing the two or more corresponding outputs with the output processor includes performing a pixel process on the two or more corresponding outputs.

40. The system of claim 39 wherein the pixel process is a shading process.

41. The system of claim 31 wherein processing the two or more segments with one or more co-processors includes processing each segment in a group with a different co-processors.

42. The system of claim 31, further comprising a notification board embodied in the main memory, wherein the notification board stores information relating to a status of one or more of the segments.

43. A processor readable storage medium having embodied therein a set of processor readable instructions for implementing a processor task and data management method, the method comprising:

dividing a processor event into two or more segments, wherein the event requires more memory space than is available in a local storage of a co-processor, and wherein each segment has a segment size that is less than or the same as an amount of memory space available in the local storage;

building a command list, wherein the command list includes instructions for processing the one or more segments; and processing the two or more segments with one or more SPE of the cell processor to produce two or more corresponding outputs, wherein processing the two or more segments includes pulling one or more commands from the command list.

44. A processor task and data management apparatus, comprising:

means for dividing a processor event into two or more segments, wherein the event requires more memory space than is available in a local storage of a co-processor, and wherein each segment has a segment size that is less than or the same as an amount of memory space available in the local storage;

means for building a command list, wherein the command list includes instructions for processing the one or more segments; and means for processing the two or more segments with one or more co-processors to produce two or more corresponding outputs, wherein processing the two or more segments includes pulling one or more commands from the command list.

* * * * *